US008812237B2

(12) United States Patent
Wilt et al.

(10) Patent No.: US 8,812,237 B2
(45) Date of Patent: Aug. 19, 2014

(54) DEEP-READING ELECTROMAGNETIC DATA ACQUISITION METHOD

(75) Inventors: Michael Wilt, Abu Dhabi (AE); Alberto Marsala, Bergamo (IT); Steve Crary, Sugar Land, TX (US); Saleh B. Al-Ruwaili, Dammam (SA); Tarek M. Habashy, Burlington, MA (US); Shouxiang Ma, Dhahran (SA)

(73) Assignees: Schlumberger Technology Corporation, Cambridge, MA (US); Saudi Arabian Oil Company, Dhahran (SA)

( * ) Notice: Subject to any disclaimer, the term of this patent is extended or adjusted under 35 U.S.C. 154(b) by 289 days.

(21) Appl. No.: 12/366,102

(22) Filed: Feb. 5, 2009

(65) Prior Publication Data
US 2010/0198519 A1    Aug. 5, 2010

(51) Int. Cl.
*G01V 1/40* (2006.01)
*G01V 3/30* (2006.01)

(52) U.S. Cl.
CPC ........................................ *G01V 3/30* (2013.01)
USPC ......... 702/7; 702/9; 702/11; 702/14; 702/189

(58) Field of Classification Search
CPC ....................................................... G01V 3/30
USPC ............................. 702/2, 6, 7, 9, 11, 14, 189
See application file for complete search history.

(56) References Cited

U.S. PATENT DOCUMENTS

| 6,393,363 | B1 | 5/2002 | Wilt et al. |
| 6,442,488 | B2 | 8/2002 | Xiao et al. |
| 6,534,986 | B2 * | 3/2003 | Nichols ......................... 324/339 |
| 7,049,821 | B2 | 5/2006 | Haber et al. |
| 7,333,893 | B2 | 2/2008 | Burtz et al. |
| 7,414,406 | B2 | 8/2008 | Banning et al. |
| 2009/0005993 | A1 | 1/2009 | Abubakar et al. |
| 2009/0150124 | A1 * | 6/2009 | Wilt et al. ......................... 703/1 |

OTHER PUBLICATIONS

Marsala, A.F., et al., Crosswell Electromagnetic Tomography in Haradh Field, Modeling to Measurements, Society of Petroleum Engineers Annual Technical Conference and Exhibition, Anaheim, California, Nov. 2007, SPE 110528, pp. 1-7.*
Zhang, Y., et al., A model-based inversion algorihm for controlled-source electromagnetic data, IEEE Antennas and Propagation International Symposium, 2007, pp. 1805-1808.*
Alumbaugh, D.L., et al., Theoretical and practical considerations for crosswell electromagnetic tomography assuming a cylindrical geometry, Geophysics, May-Jun. 1995, vol. 60, No. 3, pp. 846-870.

(Continued)

*Primary Examiner* — John Breene
*Assistant Examiner* — Yaritza H Perez Bermudez
(74) *Attorney, Agent, or Firm* — Jeremy Berman

(57) ABSTRACT

A method of measuring a parameter characteristic of a rock formation is provided, the method including the steps of obtaining crosswell electromagnetic signals between two wells and using an inversion of said signals to investigate or delineate the presence of a resistivity anomaly, such as brine in a low resistivity background, wherein the resistivity anomaly is assumed to be distributed as one or more bodies characterized by a limited number of geometrical parameters and the inversion is used to determine said geometrical parameters. The method can also be applied to determine the trajectory of an in-fill well to be drilled.

8 Claims, 3 Drawing Sheets

(56) References Cited

OTHER PUBLICATIONS

Dyck, A.V., Drill-Hole Electromagnetic Methods, Electromagnetic Methods in Applied Geophysics Applications-Part B, Nabighian, M.N. editor, 1991, vol. 2, Chapter 11, pp. 881-930, Society of Exploration Geophysicists.

Kaufman, A.A., et al., Frequency and Transient Soundings, 1983, pp. 162-212 and 257-313, Elsevier, The Netherlands.

Nyquist, J.E., et al., Comparison of an optimized resistivity array with dipole-dipole soundings in karst terrain, Geophysics, Jul.-Aug. 2007, vol. 72, No. 4, pp. F139-F144.

Routh, P.S., et al., Inversion of controlled source audio-frequency magnetotellurics data for a horizontally layered earth, Geophysics, Nov.-Dec. 1999, vol. 64, No. 6, pp. 1689-1697.

Spies, B.R., et al., Sensitivity Analysis of Cross-Well Electromagnetics, 62nd Annual International Meeting of Society of Exploration Geophysicists, Expanded Abstracts, 1992, EM4.6, pp. 502-505.

Spies, B.R., et al., Sensitivity analysis of crosswell electromagnetics, Geophysics, May-Jun. 1995, vol. 60, No. 3, pp. 834-845.

Torres-Verdin, C., et al., An Approach to Nonlinear Inversion with Applications to Cross-Well EM Tomography, 63rd Annual International Meeting of Society of Exploration Geophysicists, Expanded Abstracts, 1993, EM1.2, pp. 351-354.

Zhou, Q., et al., Audio-frequency electromagnetic tomography in 2-D, Geophysics, Apr. 1993, vol. 58, No. 4, pp. 482-495.

Alumbaugh, D.L., et al., Electromagnetic Conductivity Imaging with an Iterative Born Inversion, IEEE Transactions on Geoscience and Remote Sensing, Jul. 1993, vol. 31, No. 4, pp. 758-763.

Wilt, M. et al., Crosswell electromagnetic tomography: A new technology for oil field characterization, The Leading Edge, Mar. 1995, vol. 14, pp. 173-177.

Wilt, M.J., et al., Crosswell electromagnetic tomography: System design considerations and field results. Geophysics, May-Jun. 1995, vol. 60, No. 3, pp. 871-885.

Newman, G., Crosswell electromagnetic inversion using integral and differential equations, Geophysics, May-Jun. 1995, vol. 60, No. 3, pp. 899-911.

Alumbaugh, D.L., et al., A Numerical Sensitivity Study of Three Dimensional Imaging From a Single Borehole, Petrophysics, Jan.-Feb. 2001, vol. 42, No. 1, pp. 19-31.

Abubakar, A., et al., An integral equation approach for 2.5-dimensional forward and inverse electromagnetic scattering, Geophysical Journal International, Jun. 2006, vol. 165, Issue 3, pp. 744-762.

Marsala, A.F., et al., Crosswell Electromagnetic Tomography in Haradh Field, Modeling to Measurements, Society of Petroleum Engineers Annual Technical Conference and Exhibition , Anaheim, California, Nov. 2007, SPE 110528, pp. 1-7.

Abubakar, A., et al., Inversion Algorithms for Marine Controlled-Source Electromagnetic Data, International Petroleum Technical Conference, Kuala Lumpur, Malaysia, Dec. 2008, IPTC 12254, pp. 1-5.

Wilt. M., et al., Crosswell Electromagnetic Tomography in Saudi Arabia: from Field Surveys to Resistivity Mapping, 70th European Association of Geoscientists & Engineers Conference & Exhibition, Rome, Italy, Jun. 2008, pp. 1-5.

Zhang, Y., et al., A model-based inversion algorithm for controlled-source electromagnetic data, IEEE Antennas and Propagation International Symposium, 2007, pp. 1805-1808.

Zhang, Y., et al., Parametric inversion algorithm for marine controlled source electromagnetic data, Society of Exploration Geophysicists Annual Meeting, San Antonio, Texas, 2007, SEG Expanded Abstracts 26, pp. 569-573.

Abubakar, A., et al., A Two-and-Half-Dimensional Model-Based Inversion Algorithm for the Controlled-Source Electromagnetic Data, Society of Petroleum Engineers Annual Technical Conference and Exhibition, Anaheim, California, Nov. 2007, SPE 110054-PP, pp. 1-6.

Abubakar, A., et al., Inversion of CSEM Data with Model-based Inversion Algorithm, 70th European Association of Geoscientists & Engineers Conference & Exhibition, Rome, Italy, Jun. 2008, pp. 1-4.

* cited by examiner

DEEP-READING ELECTROMAGNETIC DATA ACQUISITION METHOD

FIELD OF THE INVENTION

This invention is generally related to the planning, acquisition, processing, and interpretation of geophysical data, and more particularly to methods for interpreting deep-reading electromagnetic data acquired during a field survey of the subsurface

BACKGROUND

Geologic formations defining a reservoir for the accumulation of hydrocarbons in the subsurface of the earth contain a network of interconnected paths in which fluids are disposed that ingress or egress from the reservoir. To determine the nature and behavior of the fluids in the aforementioned network, knowledge of both the nature of the pore fluids and the porosity of the geologic formations is desired. With this information, efficient development and management of hydrocarbon reservoirs may be achieved.

For example, the electrical resistivity of geologic formations is a function of both porosity of the formations and resistivity of the fluids. Considering that hydrocarbons are electrically insulating and most formation water is saline and thereby electrically conductive, resistivity measurements provide valuable data to determine the presence of hydrocarbon reservoirs in geologic formations. Based on resistivity measurements it is further possible to monitor the changes in hydrocarbon content as production of the hydrocarbon proceeds and water saturation increases.

In the prior art, methods and tools have been described and used to determine the electrical resistivity of geologic formations surrounding and between boreholes. In the context of the present invention, tools and methods sensitive to inter-well formation structures are referred to as "deep reading" to indicate a monitoring of resistivity in formations away from the immediate surroundings of a single borehole. Deep-reading electromagnetic field surveys of subsurface areas typically involve large scale measurements from the surface, from surface-to-borehole, and/or between boreholes. Deep reading tools and methods are designed to measures responses of the reservoir on a scale equivalent to a few percent of the distances between boreholes. This is in contrast to the established logging methods, which are confined to the immediate vicinity of the boreholes, i.e. typically within a radial distance of one meter or less. Deep reading methods are applied for determining parameters of the formation at a distance of 10 meters or more up to hundreds of meters from the location of the sensors. Field electromagnetic data sense the reservoir and surrounding media in this large scale sense.

Details on deep reading methods and tools for inter-well formations can be found for example in the two articles, "Crosshole electromagnetic tomography: A new technology for oil field characterization", The Leading Edge, March 1995, by Wilt et al. and "Crosshole electromagnetic tomography: System design considerations and field results", Geophysics, Vol. 60, No. 3, 1995 by Wilt et al. In both sources, the measurement of geologic formation resistivity is described employing low frequency electromagnetic (EM) systems. More recent deep reading surveys are described in "Crosswell Electromagnetic Tomography in Haradh Field: Modeling to Measurements", SPE 110528, Society of Petroleum Engineers, by Marsala et al. and in "Crosswell Electromagnetic Tomography in Saudi Arabia: from Field Surveys to Resistivity Mapping", presented at the EAGE conference, 9-12 Jun. 2008, by Wilt et al.

Methods and tools for performing EM measurements further are described in a number of patents and patent applications including U.S. Pat. No. 6,393,363 to Wilt and Nichols and other patents and patent applications.

In view of the known art, it is seen as one object of the invention to improve and enhance the effectiveness of deep-reading electromagnetic surveys. It is seen as a particular object of the invention to accelerate the evaluation of a survey, thus make deep-reading a potential tool for in-situ or quasi in-situ control of field development operations such as well drilling, water flooding or enhanced oil recovery (EOR).

SUMMARY OF INVENTION

The invention as described in further detail below formulates a simple model and process for interpreting crosswell and surface to borehole electromagnetic data. For this purpose, it is postulated that the interwell space consists of a heterogeneous but smoothly varying background within which are a finite number of bodies of anomalous resistivity, representing for example water filled zones. These bodies may represent a fracture zone, a reservoir section already swept by a waterflood, or perhaps an encroaching oil/water contact.

In cases where the number of EM tomography measurements are limited by well access, a simplified model such as the above offers a practical means for data interpreting whereas traditional tomographic imaging would not be effective. The new model would therefore consist of a background model and a comparatively very low number, e.g. below 50 or, more likely, in the range of perhaps 12-20, of unknown parameters representing the unknown finite body anomalies. This is in contrast to traditional tomography where the unknown parameters may number in the thousands.

Accordingly, it is seen as a first aspect of the invention to provide a method of measuring a parameter characteristic of a rock formation or its fluid content, the method including the steps of obtaining crosswell electromagnetic signals between two wells and using an inversion of said signals to investigate or delineate the presence of a resistivity anomaly, such as brine in a low resistivity background, wherein the resistivity anomaly is assumed to be distributed as one or more bodies characterized by a limited number of geometrical parameters and the inversion is used to determine said geometrical parameters.

According to a second aspect of the invention, a method of planning location and/or trajectory for a well to be drilled in the vicinity of two existing wells is provided, the method including the steps of obtaining crosswell electromagnetic signals between the two wells; using an inversion of said signals for the presence of a resistivity anomaly, wherein the resistivity anomaly is assumed to be distributed as one or more bodies characterized by a limited number of geometrical parameters and the inversion is used to determine said geometrical parameters, and using said geometrical parameters in a process of establishing said location and/or trajectory of said well.

In a preferred embodiment, the bodies introduced are simple two-dimensional (2D) or three-dimensional (3D) geometrical shapes each of which can be fully described, for example, by the position and horizontal and vertical dimensions and a single electrical resistivity value.

To accelerate the inversion process, it is advantageous to obtain a background model of the earth between two wells and to treat such background model as constant for the purpose of the inversion. This background model may be derived from an interpolation of the borehole resistivity logs and/or other measured data more advantageously in combination with a reservoir model or in the most general or simplest case by applying a homogeneous resistivity value.

In another preferred embodiment of the invention, the method includes one or more steps of determining the validity and feasibility of the survey to delineate interwell bodies of water or hydrocarbon. Some of these steps are performed before obtaining the survey data, while other tests are performed on the measured crosswell electromagnetic data set. Among those which can be performed prior to a survey is a test which includes the step of introducing test bodies of water or oil into the background model and determines the signals that may be obtained by a crosswell electromagnetic survey in the wells. The result of such a forward modeling step can indicate whether or not a real survey will be successful in delineating such bodies.

Another test potentially performed prior to the survey includes an inversion of the modeled data in order to determine the geometrical parameters of the test bodies introduced during the above forward modeling step. This inversion test on simulated data can be used to corroborate the feasibility of the survey. It may however also be used to design the survey more effectively by, for example, determining position/depth for the survey tools.

After a survey is performed other tests can be applied to the obtained crosswell electromagnetic signals. Such post-survey tests include preferably the step of testing whether the background model has been established with sufficient accuracy. If for example, as a result of this test, this accuracy is determined to be too low, the inversion of the full data set may be abandoned.

A preferred method of inverting the obtained data includes the step of successively introducing bodies of water (or oil) into the background model to reduce the mismatch between modeled and the obtained crosswell electromagnetic signals. In a preferred variant the inversion is based on parametric inversion methods.

It is seen as an important advantage of the methods presented herein to provide a fast inversion within temporal proximity to the process of drilling an in-fill well into the volume between the two wells used for the EM survey evaluated. Hence, it is a further preferred feature of the invention that survey data can be inverted and/or evaluated to derive control parameters for a drilling process within days or even within hours of the data acquisition.

Further details, examples and aspects of the invention will be described below referring to the following drawings.

DETAILED DESCRIPTION

Figure 1:
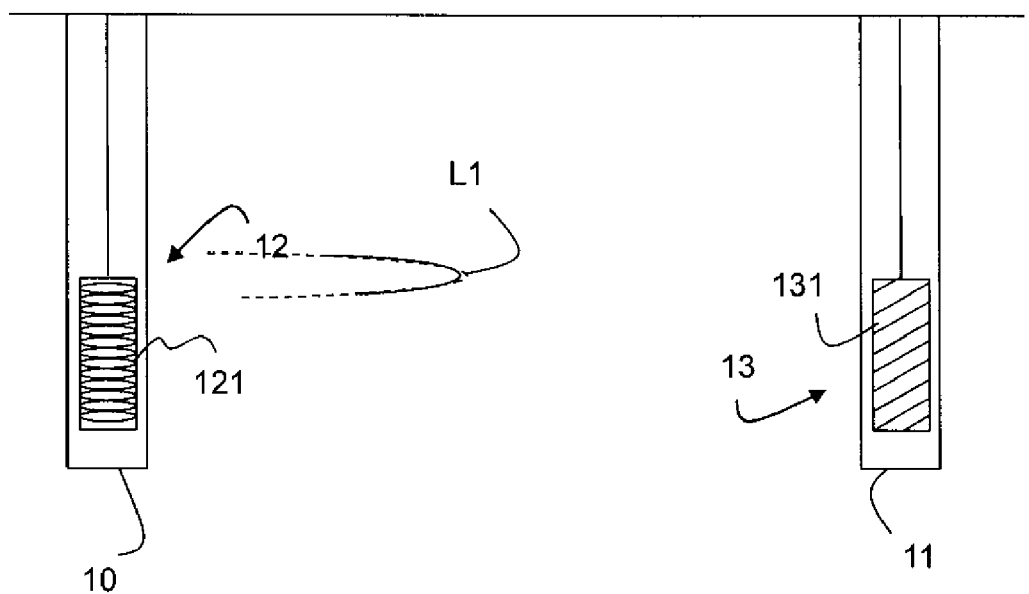
FIG. 1 illustrates a conventional electromagnetic crosswell survey operation.

FIG. 1 shows the configuration of equipment used in the measurement of geologic formation resistivity between two boreholes 10, 11. A transmitter 12 is located in one borehole and consists of a coil 121 of $N_T$ turns with an effective cross section $A_T$. The multi-turn loop carries an alternating current $I_T$ at a frequency of $f_0$ Hz. This multi-turn horizontal loop produces a time varying magnetic field $B_0$. The magnetic field $B_0$ is proportional to the magnetic moment of the transmitter $M_T$ and to a geometric factor $k_1$. The magnetic moment of the transmitter $M_T$ is defined as the product $$M_T = N_T * I_T * A_T \qquad [1].$$

The geometric factor $k_1$ is a function of a spatial location and orientation of a field component of the magnetic field $B_0$ measured by a receiver 13 with respect to the magnetic moment of the transmitter $M_T$. The receiver is located separately from the transmitter 12 and typically disposed in a borehole in the earth. The magnetic field $B_0$ is defined as follows:

$$B_0 = k_1 * M_T \qquad [2].$$

The receiver 13 typically includes a multi-turn loop of wire, i.e., a coil 131 having $N_R$ turns of wire, wound about a core of high permeability metal or ferrite. The changing magnetic field $B_R$ sensed by the receiver 13 with frequency $f_0$ creates an induced voltage $V_R$ in the coil which is proportional to $B_R$, the frequency $f_0$, the number of turns of wire $N_R$, the effective cross-sectional area of the coil $A_R$, and the effective permeability of the core of coil 131. From the foregoing, it is shown that $V_R$ is defined as follows:

$$V_R = f_0 * B_R * N_R * A_R * \mu_R. \qquad [3]$$

Simplifying equation [3] above, $V_R$ may be written as follows:

$$V_R = k_R * B_R, \qquad [4]$$

where $k_R = f_0 * N_R * A_R * \mu_R$. The product of $A_R * \mu_R$ is difficult to calculate. To accurately determine $A_R * \mu_R$, the coil 131 is calibrated in a known field, at a known frequency to find an exact value for $k_R$. Thereafter, the magnetic field $B_R$ sensed by the receiver 13 is related directly to the measured voltage $V_R$ by the following:

$$B_R = V_R / k_R. \qquad [5]$$

Such sensors measure the magnetic field in the direction of the axis of the solenoid. When this system is placed in a conducting geologic formation the time varying magnetic field $B_0$ produces an electromotive force in the geologic formation, which in turn drives currents therein, shown schematically as L1 in FIG. 1. The currents L1 are proportional to the conductivity of the geologic formation and are concentric about the longitudinal axis of the borehole. The magnetic field proximate to the borehole is a result of the free space field $B_0$ called the primary magnetic field, and the field from the current L1, called $B_S$ the secondary magnetic field. The sum of these fields is a vector and the described sensors thus measure a component of the vector field in the direction of the solenoidal axis.

At very low frequencies, where the inductive reactance of the surrounding formation is small, the current L1 is typically out of phase with respect to the transmitter current $I_T$. As the frequency increases, the inductive reactance increases and the phase increases to be greater than 90°.

The secondary magnetic field $B_S$ at the receiver 13 is caused by the induced current and consequently also has a phase shift and so the total field is complex. The total measured field has a component $B_R$ in-phase with the transmitter current $I_T$, (called the real component) and a component $B_I$ phase shifted by 90° (called the imaginary or quadrature component). The values of the real $B_R$ and quadrature components $B_I$ of the magnetic field at a given frequency and geometrical configuration can be used to determine the electrical resistivity of a homogenous formation penetrated by the wellbores 10, 11. In an inhomogeneous geologic formation, the complex field is measured at a succession of points along the longitudinal axis of the receiver borehole for each of a succession of transmitter locations. The multiplicity of T-R locations suffices to determine the inhomogeneous resistivity between the holes.

In general, the inhomogeneous distribution of electrical resistivity is determined through a process called inversion which is well described by "Audio-frequency electromagnetic tomography in 2-D", Geophysics, Vol. 58, No. 4, 1993 by Zhou et al., "Electromagnetic conductivity imaging with an iterative born inversion", IEEE Transactions on Geoscience and Remote Sensing, Vol. 31, No. 4, 1993 by Alumbaugh et al., "An approach to nonlinear inversion with applications to cross-well EM tomography" 63 rd Annual International Meeting, Society of Exploration Geophysics, Expanded Abstracts, 1993 by Torres-Verdin et al., and "Crosswell electromagnetic inversion using integral and differential equations", Geophysics, Vol. 60, No. 3, 1995 by Newman.

This process has been well demonstrated for the determination of resistivity in the vicinity of a single borehole or between spaced-apart boreholes wells and is described in detail by "Crosswell electromagnetic tomography: System design considerations and field results", Geophysics, Vol. 60, No. 3, 1995 by Wilt et al., "Theoretical and practical considerations for crosswell electromagnetic tomography assuming a cylindrical geometry", Geophysics, Vol. 60, No. 3, by Alumbaugh and Wilt, and "3 D EM imaging from a single borehole; a numerical feasibility study", by Alumbaugh and Wilt, Petrophysics 42, No. 1, p. 19-31, 2001.

In brief, the inversion process consists in assigning resistivities to a multitude of cells or elements of the volume surrounding, or between, boreholes. The resistivities are systematically varied until, in a least squares sense, the results from the cellular model of the formation match the observed data taken with the field transmitter receiver system described herein.

In other known inversion processes, a more specific model of the formation is assumed using geological, well log or other geophysical data The parameters of this model (e.g. resistivity distribution, shape, layer thickness, etc.) are varied until, again in a least squares sense, the numerical results from the model match the field results.

Alternatively, direct images of the distribution of resistivity may be obtained following the principles of diffusion tomography as described by the above referenced "Audio-frequency electromagnetic tomography in 2-D". Geophysics, Vol. 58, No. 4, 1993 by Zhou et al. According to yet another known method, multifrequency em data is transformed to a mathematically defined wave field domain and the data are processed following the procedures of seismic tomography.

In accordance with an example of the present invention to be described in greater detail below, existing wells in the neighborhood of a proposed infill well location are used to collect a very limited set of EM tomographic data. The data is then used to locate substantial accumulations of salt water saturated reservoir rock between the tomography wells. The salt water saturated rock is distinguished by its low electrical resistivity, a property that provides a significant response to the tomography EM measurements. Oil saturated rocks, on the other hand, are typically characterized by higher electrical resistivity.

The presence of zones of oil saturated rocks usually produces a large response on the EM tomography which allows them to be detected and approximately imaged in spite of the poor tomographic aspect ratio, i.e. the ratio between the EM surveyed depth interval and the cross-wells distance, which can be for example less than 0.5.

If zones of water or oil are present and once identified using the methods in accordance with the present invention, any infill drilling can be planned such that zones of water saturated rock are avoided, thus reducing the risk of drilling failure, in particular avoiding early water production.

Figure 2:
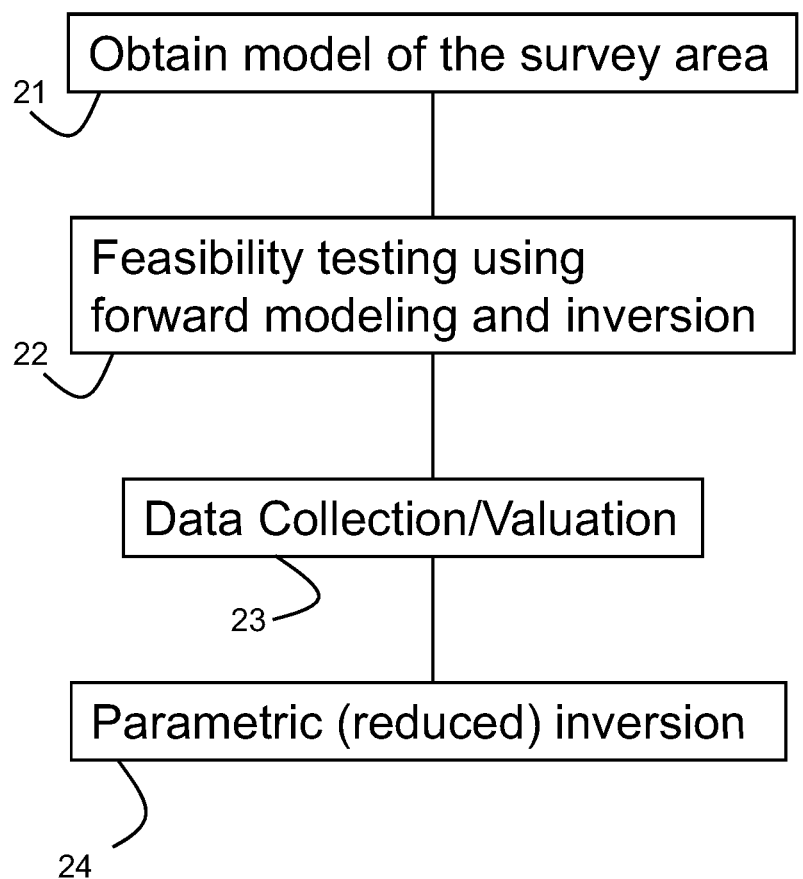
FIG. 2 is a flow chart illustrating steps in accordance with an example of the invention.

This example of the invention describes a set of steps to obtain a diagnostic interwell resistivity image in a shorter time span than traditional crosswell EM tomography. This fast path processing of this example is structured into steps as shown in FIG. 2.

In step 21 a background model is made using the known geology and logs in the region surrounding the wells of interest using for example a standard reservoir modeling builder such as PETREL™ commercially available from Schlumberger. From such a model a cross-section can be extracted to represent the geology and petrological state of the cross-section between the observer wells, which is designed to become the observation area or volume of the EM survey.

The background model is used in a feasibility test or simulation involving forward modeling and inversion step 22. The forward modeling typically uses methods as described by Abubakar et al., in "An integral equation approach for 2.5-dimensional forward and inverse electromagnetic scattering", Geophys. J. Int. Vol. 165, Issue 3, p. 744-762, May 2006. The inversion process used for this step 22 is typically based on the methods described by Habashy et al. in "Inversion Algorithms for Marine Controlled-Source Electromagnetic Data"; IPTC#12254, International Petroleum Technology Conference, Malaysia, December 2008, incorporated herein by reference.

The inversion process treats the background resistivity distribution as known. As described above, the background can be derived from logs and known geology. The background part of the model is fixed during the inversion. The unknown parameters are the location, dimension and/or resistivity of a finite series of water saturated zones between the wells.

In this simulation step 22 many of the known inversion methods can be applied to the data derived from the forward modeling. However it is seen as advantageous to use at this stage the same inversion method as to be applied at a later stage to the measured data (see below).

For the initial simulation a limited amount, e.g., three or five, regions of potential high water saturation between the wells are sought to be identified in a background otherwise treated as constant. These bodies are identified using available logs to fix the formation resistivity and using the existing geological model to estimate dimensions.

The simulation described above is used as a test of the viability of a survey. The simulation compares the response of the model with the water zones at the specified locations to the response without the bodies. In case this difference is below a threshold value, e.g., five percent, it may be decided to not pursue the survey.

The second stage in the simulation 22 is an inversion stage, in which the inversion process is used to re-construct the position of the water saturated bodies from test data derived from the forward modeling step. Starting with initial positions and dimensions of the group of interwell bodies and assuming that the resistivity of the watered-out intervals is known or can be derived from logs, the inversion then adjusts the model by adjusting the position and dimensions of the bodies until the survey data fit within a specified tolerance. This reconstruction is then compared to the actual position and dimensions of the test bodies. For this step, the resistivity distribution in the background model should be reasonably accurate. Large errors in the background model can render ineffective the process of identifying distinct water bearing zones.

The inversion step of the simulation can be used to verify whether the objects sought to be identified in a later survey can in principle be observed in the data to be acquired. However, the inversion step can also be used to identify those data which are most sensitive to the presence of the resistivity anomalies, e.g. the watered zones, of interest. The sensitivity of the model to variations in the data can be determined using, for example, model evaluation techniques such as the Frechet derivative.

In a Frechet type test, a model parameter is varied and correlated to the associated change of the calculated data, effectively investigating the derivative d(data)/d(model). By identifying which of the forward modeled data is most sensitive to the presence of the test bodies, a test procedure can be developed which indicates, for example, at which depths source or receivers are best placed to determine the location of the bodies or zones of water. This survey design or data template derived from the inversion is then advantageously used during the following EM crosswell logging operation for positioning transmitters and receivers at the depth identified.

In the step 23 a limited set of crosswell data is collected as limited by the well access. The positioning of the tools in the two wells are at the stage advantageously guided by the survey design derived in the simulation stage.

During data collection it is important to determine the accuracy of the measurements. An estimate of the rough level of error in the measurements can be used during the subsequent inversion to specify tolerance limits.

The tolerance limits as derived from the error level in the observed data are applied in a step of validating the suitability or accuracy of the background model. For the validation the observed data must fit the background within a specified tolerance in order to proceed to the parametric inversion. The tolerance can be linked with the error of the measurements in the data collection. After a successful validation, the inverse process starts with the search for the precise location and size anomalous zones.

In the inversion step 24, the data are analyzed, typically using parametric inversion based on the methods described by Habashy et al. in "Inversion Algorithms for Marine Controlled-Source Electromagnetic Data"; IPTC#12254, International Petroleum Technology Conference, Malaysia, December 2008, incorporated herein by reference. The inversion used is more suitable for this problem than the standard pixelized inversion as a result of the limited data obtained and the often low aspect ratio caused by the surveyed depth interval for this method typically being much shorter than the interwell distance.

Figure 3:
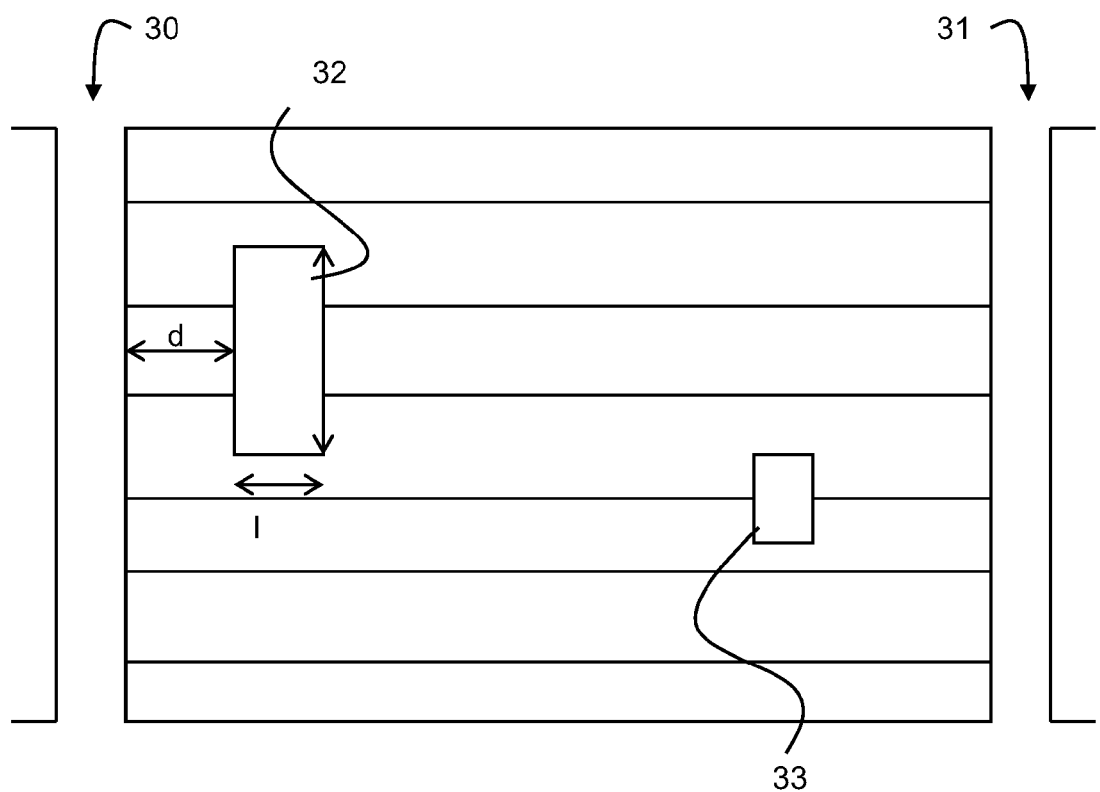
FIG. 3 illustrates a step in accordance with an example of the invention.

As illustrated by FIG. 3, at this stage of the inversion process a single zone or body 32 is placed in the formation between the wells 30, 31 as specified by the user. The inversion will then adjust the position and dimensions of the zone, but not the resistivity, until the misfit is below the tolerance (as determined by the data error). If after the first iteration the misfit is still above the tolerance, the process is repeated after the introduction of a further body 33 of water. The iterations stop when the misfit between the observed data and the model is below the threshold.

The process described above can be very rapid compared to conventional crosswell surveys. As the survey data set and model parameters are significantly limited the inversion can be performed on current computing equipment within a few minutes. Each step in the above procedure should therefore be completed in about one hour or less.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative processes, one skilled in the art will recognize that the system may be embodied using a variety of specific procedures and equipment and could be performed to evaluate widely different types of applications and associated geological intervals. Accordingly, the invention should not be viewed as limited except by the scope of the appended claims.

What is claimed is:

1. A method of performing a crosswell electromagnetic survey, said method comprising the steps of performing a feasibility test based on a background model and a determination of effect of bodies of water or oil on a crosswell survey, the feasibility test including introducing at least one test body of water or oil into the background model to obtain a modeled set of crosswell electromagnetic signals and inverting the modeled set to determine locations of the test bodies;

based on a positive result of the feasibility test, obtaining crosswell electromagnetic signals representative of electromagnetic parameters in the earth between two wells;

estimating a level of error in obtainment of the crosswell electromagnetic signals;

validating the crosswell electromagnetic signals based upon the level of error being below a tolerance level;

based upon validation of the crosswell electromagnetic signals, using an inversion of said crosswell electromagnetic signals for the presence of a resistivity anomaly, wherein said resistivity anomaly is assumed to be distributed as one or more bodies characterized by a limited number of geometrical parameters from the entirety of a full data set of geometrical parameters within a known or assumed background held constant for purposes of inversion, and the inversion is used to determine said geometrical parameters, wherein the inversion includes correcting the background model by adjusting position and dimension of the one or more bodies until mismatch between the obtained crosswell electromagnetic signals and the modeled set of crosswell electromagnetic models is less than a specified tolerance.

2. A method of determining a location and/or trajectory of a well to be drilled in the vicinity of two existing wells, said method comprising the steps of performing a feasibility test based on a background model and a determination of effect of bodies of water or oil on a crosswell survey, the feasibility test including introducing at least one test body of water or oil into the background model to obtain a modeled set of crosswell electromagnetic signals and inverting the modeled set to determine locations of the test bodies;

based on a positive result of the feasibility test obtaining crosswell electromagnetic signals representative of electromagnetic parameters in the earth between the two wells;

estimating a level of error in obtainment of the crosswell electromagnetic signals;

validating the crosswell electromagnetic signals based upon the level of error being below a tolerance level;

based upon validation of the crosswell electromagnetic signals, using an inversion of said crosswell electromagnetic signals for the presence of a resistivity anomaly, wherein said resistivity anomaly is assumed to be distributed as one or more bodies characterized by a limited number of geometrical parameters from the entirety of a full data set of geometrical parameters and the inversion is used to determine said geometrical parameters, wherein the inversion includes correcting the background model by adjusting position and dimension of the one or more bodies until mismatch between the obtained crosswell electromagnetic signals and the modeled set of crosswell electromagnetic models is less than a specified tolerance, and using said geometrical parameters in a process of establishing said location and/or trajectory.

3. The method of claim 2 wherein the geometrical parameters are representative of the dimensions and location of the one or more bodies.

4. The method of claim 2 further comprising the step of obtaining a background model of the earth between two wells and treating such background as constant for the purpose of the inversion.

5. The method of claim 4 wherein a mismatch is established between the background model and the obtained crosswell electromagnetic signals prior to the inversion.

6. The method of claim 2 wherein a parametric inversion method is used.

7. The method of claim 2 wherein the inversion is performed on mobile computing equipment at the location of the two wells.

8. The method of claim 2 wherein the inversion is performed in five hours or less.

\* \* \* \* \*